Oct. 17, 1950      J. R. V. DOLPHIN      2,525,877
BICYCLE
Filed Feb. 5, 1947      4 Sheets-Sheet 1
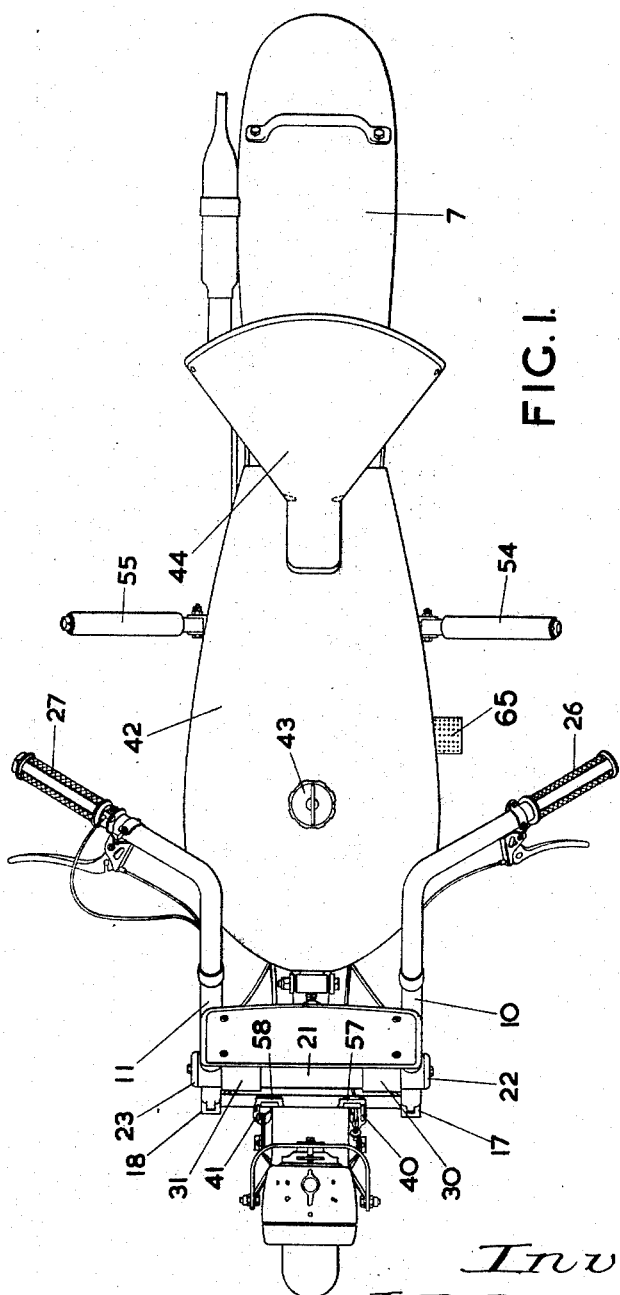
FIG. I.
Inventor
J. R. V. Dolphin

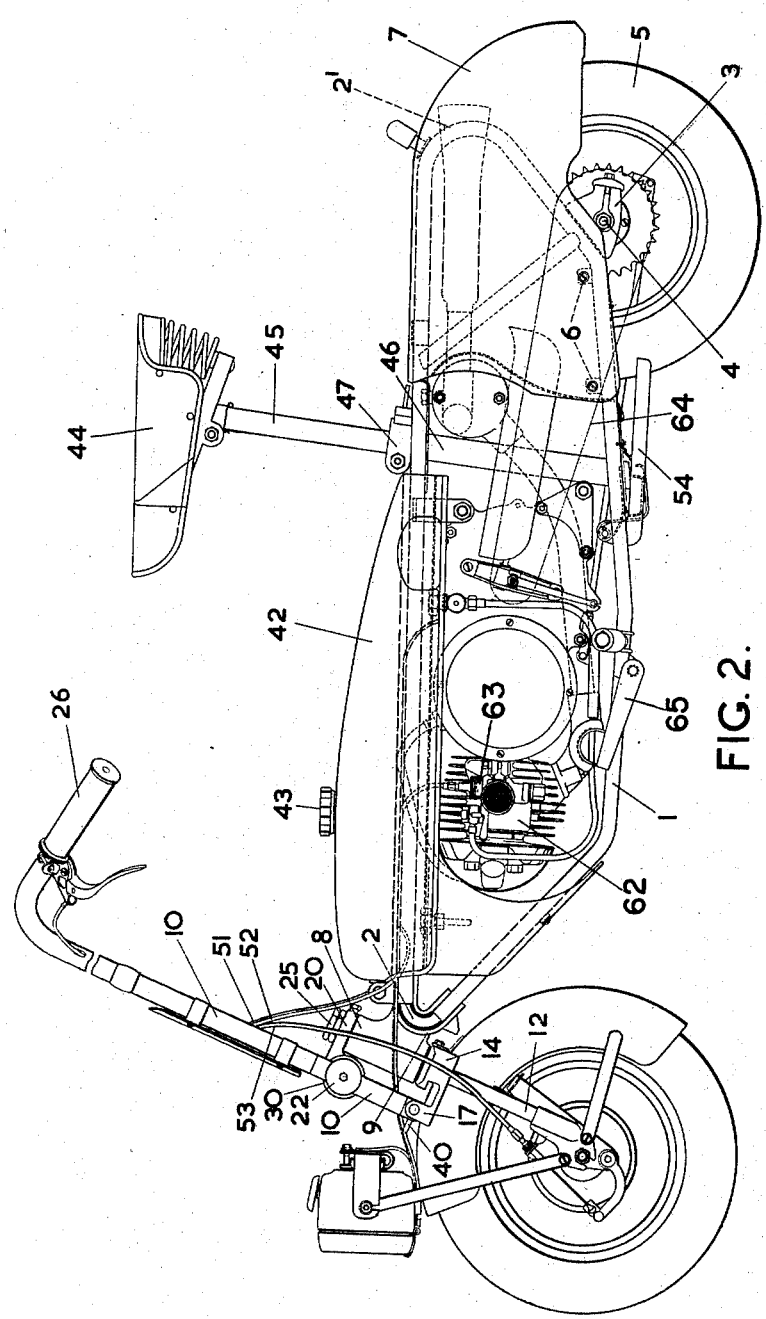

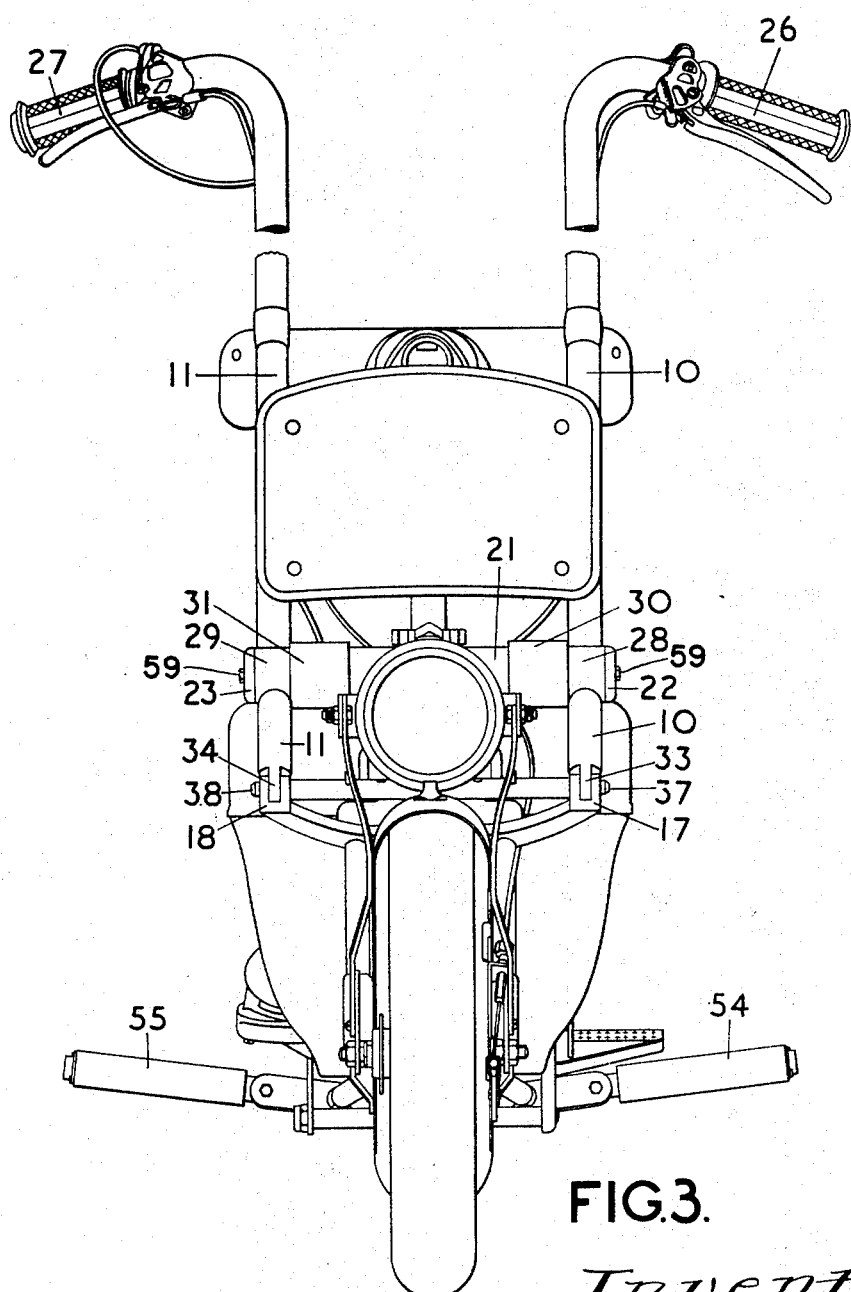

Oct. 17, 1950 J. R. V. DOLPHIN 2,525,877
BICYCLE
Filed Feb. 5, 1947 4 Sheets-Sheet 4
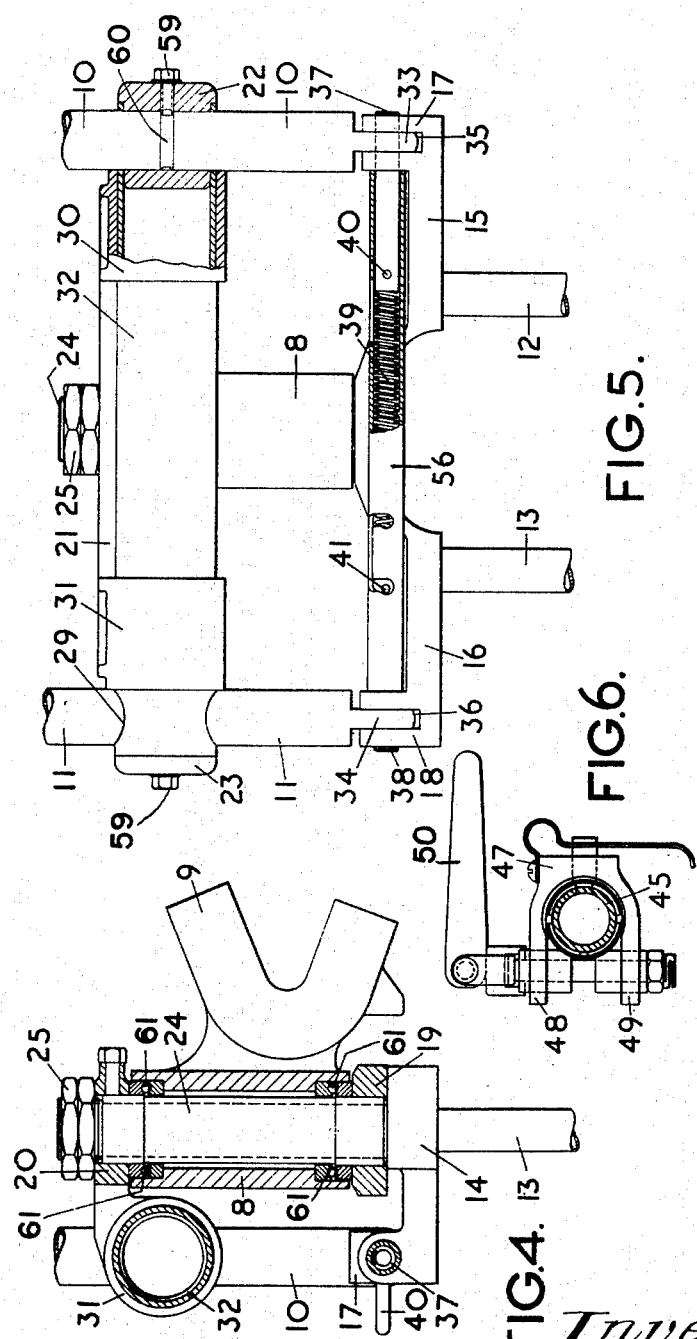

Patented Oct. 17, 1950

2,525,877

UNITED STATES PATENT OFFICE 2,525,877

BICYCLE

John Robert Vernon Dolphin, Welwyn, England, assignor to Corgi Motor Cycle Company Limited, Welwyn, England, and Dolphin Industrial Developments Limited, Reading, England Application February 5, 1947, Serial No. 726,514
In Great Britain February 19, 1946

8 Claims. (Cl. 280—278)

This invention relates to bicycles and particularly to motor bicycles and has for its object to provide a light weight machine which will be of strong and robust construction and which, when not in use, can be packed into a small compass so that it may be easily transported from place to place. A machine in accordance with the invention is therefore not only extremely useful for airborne or parachute troops but also has very considerable advantages in ordinary commercial use in that, while adapted for use as an ordinary motor bicycle, it can be readily collapsed when not required in use so as to be easily stored in confined spaces and so as to be readily portable in transit from place to place when not proceeding under its own power.

The invention consists in a bicycle comprising a light but rigid frame to which the handles are individually pivoted in such a way as to be capable of being swung upwards to a convenient height for use, or downwards into close proximity with the frame when not required.

If desired, the seat pillar may also be mounted in such a way as to be capable of being extended to a convenient height for use, or lowered into proximity with the frame so that when not required in use the overall height of the machine is substantially only the height of the frame.

In addition, means may be provided whereby the aforesaid handles may be folded towards one another so that the overall width of the machine when collapsed is substantially the width of the frame.

According to the preferred arrangement the handles are formed as separate units which are pivotally mounted in a frame member carried on the upper part of the front wheel fork member, means being provided for detachably retaining such units in their extended or operative position, whereby such units may be downwardly swung when the handles are to be collapsed.

These units preferably consist of bent tubular members which may be pivotally mounted in said frame in such a way as to be capable of individual rotation when they are freed from their retaining position.

The invention will be more completely understood from the following detailed description which is given in conjunction with the accompanying drawings, in which:

Figures 1, 2 and 3 are plan, side and front views respectively of a motor bicycle constructed in accordance with the invention;

Figures 4 and 5 are enlarged side and front views respectively of the arrangement for securing the handles in position;

Figure 6 is an enlarged plan view of the arrangement for securing the seat pillar in position.

Referring now to these drawings, the frame of the improved motor bicycle is formed from two closed loops 1, formed preferably of tubular material, these loops being disposed substantially parallel to one another and being united by plates or other rigid members where required. Each loop has the upper and lower portions substantially parallel to one another for a part of their length and terminate in angular portions 2, 2', substantially in alignment with the upper part of the frame. The lower portions of the loops have secured thereto a pair of brackets 3 carrying the axle 4 of the rear wheel 5, and a set of brackets 6 for the rear mud-guard 7, while the front portions of the loops are welded or otherwise united to a bracket 8 to which the upper part of the front wheel fork member is freely mounted, the angular portions 2 of the loops 1 passing through angular sleeve members 9 which are rigidly secured to the bracket 8.

The handles instead of springing from the upper end of the front wheel fork member in the orthodox manner are constructed as two separate units of tubular formation each of which consists in a substantially upright member bent over substantially at right-angles at its upper end to form a hand-grip 26, 27. The two upright portions 10, 11, are spaced apart from each other and are mounted substantially parallel to one another in the following manner. Rigidly secured to the upper ends of the front forks 12, 13, just below the aforesaid bracket 8 is a frame or yoke piece 14 which extends forwardly of the bracket 8 and has laterally extending arms 15, 16, provided with upstanding brackets 17, 18, at each end. Immediately above the aforesaid bracket 8 there is disposed a second frame piece 20 which extends forwardly from the bracket 8 and carries a transverse cross member 21, the ends of which are disposed immediately above the end brackets 17, 18, of the lower frame or yoke piece 14. The bracket 8 is held in position by a central spindle or trunnion 24 which is secured between the yoke piece 14 and the frame piece 20 by the lock nut 25, and is carried in bearings 61 disposed in the bracket 8. The latter bracket thus forms a sleeve bearing for the yoke piece 14 and frame piece 20 which are thus free to swing with the front wheel forks 12, 13. The upright portions 10 of the handles which are of straight tubular formation are arranged to pass through apertures 28, 29, in the opposite end parts 22, 23, of the transverse cross member 21, while the lower ends of these upright portions 10 are detachably secured to the ends of the lower frame or yoke piece 16. Conveniently, the transverse cross member 21 carries a pair of tubular sleeves 30, 31, the upright portions 10, 11, of the handles passing through apertures 28, 29, in a tube or shaft 32 which is rotatably mounted in the tubular sleeves 30, 31, and extends a short distance from them at either end, the lower ends of the upright portions 10, 11, of the handles terminating in perforated tongues 33, 34, which are adapted to fit into perforated slots 35, 36, formed in the aforesaid brackets 17 and 18 of the yoke piece 16, to which they are detachably secured by locking pins or bolts 37, 38. These locking pins or bolts 37, 38, which are oppositely disposed to one another, are slidably mounted in a tubular cross piece 56, and are spring loaded by means of a common helical spring 39, a pair of controlling pins or handles 40, 41, being provided for simultaneously withdrawing the two locking bolts 37, 38, from the tongues 33, 34, and slots 35, 36, against the action of the spring 39 when it is desired to free the lower extremities of the handles 10, 11, the pins or handles 40, 41, being disposed in slots 57, 58, which are provided with locating positions at each end as shown in Figure 1.

It will be seen that with this arrangement, when the handles are locked in position as described above, they are effectively attached to the front fork through the yoke piece 14, and frame piece 21 hereinbefore described, while rotation of the individual handles is prevented due to the locking of their lower extremities, the arrangement of the tongues 33, 34, on their extremities being such that the upper portions of the handles extend outwardly and backwardly so as to form conveniently positioned hand-grips for the rider. When, however, it is desired to collapse the handles, the locking pins 37, 38, are removed from the aforesaid tongues 33, 34, whereupon the handles 10, 11 which are now free to rotate within the apertures 28, 29, can be swung downwardly about the transverse frame piece 21 as a pivot, the inner tube or shaft 32 through which the handles 10, 11, pass, rotating within the tubular sleeves 30, 31. The handles 10, 11, can then be swung down until the original upright portions are disposed substantially horizontally, and the handles can also be rotated individually within the apertures 28, 29 so that the extremities forming the hand-grips 26, 27, can be turned downwardly against the frame of the cycle the locating stops 59 riding within the circumferential slots 60 provided in the handles 10 and 11.

The fuel tank 42 is conveniently mounted on the upper parts of the loops 1 of the cycle in such a position that when the handles are swung into the collapsed position they are disposed substantially level with the top of the tank, the latter being positioned between the handle grips 26, 27, when they are folded together. The tank 42 is fitted with a filler cap 43 and may if desired be provided with a hand-operated pressure pump to create a pressure within the tank and an automatic air release valve to limit the degree of pressure that may be set up. The seat 44 is carried upon a pillar 45 which may be telescoped into a tube 46 located within the frame and conveniently held, for example, at its upper and lower ends by transverse plate members uniting the frame. The pillar 45 is secured in position by means of a bracket 47 secured to the upper part of the tube 46, and having a pair of arms 48, 49 partially embracing the pillar 45, these arms 48, 49, being controlled by a handle 50 by means of which they may be clamped together or released as desired. The arrangement is such that when the bicycle is to be used the seat 44 may be moved to a convenient height at which it may be located by a spring-loaded detent and secured by the clamping arrangement described, while when not required in use the seat pillar 45 may be lowered within its supporting tube 46 so that the seat 44 rests snugly on the upper portion of the frame and at approximately the level of the rear mud-guard 7.

The construction of the bicycle is completed by providing an engine 62 of suitable form, carburettor 63, transmission chain 64, adjustable foot-brake 65 and other adjuncts common in motor bicycle construction and there may be the usual controls actuated by the handles or by members secured thereon and through the intervention of Bowden or like remote controlling means such as for example 51, 52, 53. There may also be foot-rests 54, 55, provided which can be folded into proximity with the frame when the machine is not required in use.

It will be seen from the foregoing description that the motor bicycle while of strong and rigid construction and suited to normal or even rough usage may be collapsed into a relatively very small compass both as regards heights and width so that it can be stored in confined or limited space and can be readily transported from place to place.

While the invention has been described as applied to a motor bicycle it is to be understood that it may also be applied to push cycles, in which case collapsible handles and/or a collapsible seat pillar similar to those hereinbefore described may be employed, the engine and associated gear being omitted.

I claim:

1. In a bicycle of the kind comprising a pair of steering handles pivotally connected to the front wheel support of the bicycle so as to be swingable relative to said support and to the main frame of the bicycle upwards to a convenient height for use and downwards into close proximity with the frame when not required, the provision of a bearing member between each handle and the front wheel support and mounted for pivotal movement relative to said front wheel support about a substantially horizontal axis transverse to the longitudinal axis of the bicycle, each of said handles extending transversely of the axis of pivoting of its associated bearing member, an extension on said handles on the side of said pivotal axis opposite to that of the handles and means adapted with the handles in their operative position to lock said extensions releasably to said front wheel support.

2. In a bicycle of the kind comprising a pair of steering handles pivotally connected to the front wheel support of the bicycle so as to be swingable relative to said support and the main frame of the bicycle upwards into a convenient height for use and downwards into close proximity with the frame wheel when not required, the provision of a handle supporting element pivotally connected to said front wheel support for pivotal movement in relation thereto about a substantially horizontal axis transverse to the longitudinal axis of the bicycle, said handles comprising stem portions carrying said handles pivotally mounted on said element about an axis longitudinal of said stem portions, said handles extending transversely in relation to said stem portions so as to be foldable towards one another when collapsed and means adapted with the handles in their operative position to lock the same against pivotal movement about either of said pivotal axes.

3. A bicycle comprising a main frame, a front wheel support carried in the forward part of said main frame, a pair of steering handles pivotally connected to said front wheel support so as to be swingable relative to said support and to the main frame of the bicycle upwards to a convenient height for use and downwards into close proximity with the frame when not required, a bearing member disposed between each handle and said front wheel support and mounted for pivotal movement relative to said front wheel support about a substantially horizontal axis transverse to the longitudinal axis of the bicycle, each of said handles comprising stem portions carrying said handles pivotally mounted on said bearing member so as to be foldable towards one another when collapsed, said front wheel support being provided with means adapted with the handles in their operative position to lock the same against pivotal movement about either of said pivotal axes.

4. A bicycle comprising a main frame, a front wheel support carried in the forward part of said main frame and a pair of steering handles pivotally connected in said front wheel support in such a way that their pivotal axis is disposed horizontally and transversely to the longitudinal axis of the bicycle so that said handles can be swung about such axis upwardly into an operative position convenient for use and downwardly into a collapsed position in which they are disposed in close proximity to the frame, said handles comprising bent tubular members individually rotatably mounted at positions intermediate their ends in a common trunnion pivotally arranged in a supporting member carried on the upper part of said front wheel support, a retaining member carried by said front wheel support, means adapted detachably to secure the lower extremities of said handle in said retaining member when said handles are disposed in their operative position, and said retaining member being adapted with the handle so disposed to secure them against both pivotal and rotational movement.

5. A bicycle as claimed in claim 3, wherein said handles comprise bent tubular members which are mounted at positions intermediate their ends in a common trunnion pivotally arranged in a frame member carried on the upper part of said front wheel support, the lower extremities of said handles being detachably retained in a second frame rigidly disposed with respect to said frame member when said handles are in their operative position.

6. A bicycle as claimed in claim 5, wherein said trunnion comprises a tubular member freely mounted in said frame member so as to permit pivotal movement of said handles, said trunnion having apertures in which said handles are disposed so as to be free for individual rotation about their own axes when the lower extremities of said handles are detached from said second frame.

7. A bicycle as claimed in claim 6, and comprising a pair of oppositely disposed spring loaded locking pins slidably mounted in said second frame for engaging with the lower extremities of the handles and a pair of oppositely disposed actuating members for withdrawing said locking pins from their locking positions so as to free said handles for pivotal movement.

8. A bicycle as claimed in claim 3, wherein said handles comprise bent tubular members which are mounted at positions intermediate their ends in a common trunnion pivotally arranged in a frame member carried on the upper part of said front wheel support, the lower extremities of said handles being detachably retained in a second frame rigidly disposed with respect to said frame member, when said handles are in their operative position, said second frame being provided with slots with which the lower extremities of said handles co-operate, and means being provided for locking the extremities of said handles within said slots.

JOHN ROBERT VERNON DOLPHIN.

REFERENCES CITED

The following references are of record in the file of this patent:

UNITED STATES PATENTS

| Number | Name | Date |
|---|---|---|
| 471,639 | Horstmannshoff | Mar. 29, 1882 |
| 1,787,150 | Gerow et al. | Dec. 30, 1930 |

FOREIGN PATENTS

| Number | Country | Date |
|---|---|---|
| 643,789 | Germany | Apr. 16, 1935 |
| 526,773 | Great Britain | Mar. 31, 1939 |
| 590,399 | Great Britain | July 16, 1947 |